United States Patent
Bhandaru et al.

(10) Patent No.: US 9,141,426 B2
(45) Date of Patent: Sep. 22, 2015

(54) PROCESSOR HAVING PER CORE AND PACKAGE LEVEL P0 DETERMINATION FUNCTIONALITY

(71) Applicant: Intel Corporation, Santa Clara, CA (US)

(72) Inventors: Malini K. Bhandaru, Sudbury, MA (US); Matthew M. Bace, North Andover, MA (US); A Leonard Brown, Weston, MA (US); Ian M. Steiner, Hillsboro, OR (US); Vivek Garg, Folsom, CA (US); Eric Dehaemer, Shrewsbury, MA (US); Scott P. Bobholz, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 13/631,831

(22) Filed: Sep. 28, 2012

(65) Prior Publication Data
US 2014/0096137 A1    Apr. 3, 2014

(51) Int. Cl.
*G06F 9/46* (2006.01)
*G06F 9/48* (2006.01)
*G06F 11/34* (2006.01)
*G06F 1/32* (2006.01)

(52) U.S. Cl.
CPC ............ *G06F 9/4881* (2013.01); *G06F 1/324* (2013.01); *G06F 1/3243* (2013.01); *G06F 1/3287* (2013.01); *G06F 11/3409* (2013.01); *G06F 2201/865* (2013.01); *G06F 2201/88* (2013.01)

(58) Field of Classification Search
CPC .............. G06F 9/4893; G06F 11/3466; G06F 2201/88; G06F 9/4881; G06F 11/3409; G06F 2201/865; G06F 1/324; G06F 1/3243; G06F 1/3287

USPC .......................................... 718/102, 100.102
See application file for complete search history.

(56) References Cited

U.S. PATENT DOCUMENTS

| | | | |
|---|---|---|---|
| 5,892,959 A * | 4/1999 | Fung .............................. | 713/323 |
| 7,360,103 B2 * | 4/2008 | Lint et al. ...................... | 713/300 |
| 8,135,970 B2 * | 3/2012 | Gaskins et al. ................ | 713/322 |
| 8,683,240 B2 * | 3/2014 | Burns et al. ................... | 713/300 |
| 2004/0268347 A1 * | 12/2004 | Knauerhase et al. ............. | 718/1 |
| 2005/0044319 A1 | 2/2005 | Olukotun | |
| 2006/0005051 A1 | 1/2006 | Golla et al. | |

(Continued)

OTHER PUBLICATIONS

PCT International Search Report for PTC Counterpart Application No. PCT/US2013/044571, 3 pgs., (Sep. 17, 2013).

(Continued)

*Primary Examiner* — Emerson Puente
*Assistant Examiner* — Willy W Huaracha
(74) *Attorney, Agent, or Firm* — Nicholson De Vos Webster & Elliott, LLP

(57) ABSTRACT

A processor is described that includes a processing core and a plurality of counters for the processing core. The plurality of counters are to count a first value and a second value for each of multiple threads supported by the processing core. The first value reflects a number of cycles at which a non sleep state has been requested for the first value's corresponding thread, and, a second value that reflects a number of cycles at which a non sleep state and a highest performance state has been requested for the second value's corresponding thread. The first value's corresponding thread and the second value's corresponding thread being a same thread.

20 Claims, 5 Drawing Sheets

(56) References Cited

U.S. PATENT DOCUMENTS

| | | | |
|---|---|---|---|
| 2006/0090161 A1* | 4/2006 | Bodas et al. | 718/100 |
| 2007/0288728 A1* | 12/2007 | Tene et al. | 712/227 |
| 2010/0185820 A1* | 7/2010 | Hughes et al. | 711/135 |
| 2010/0229012 A1 | 9/2010 | Gaskins et al. | |
| 2011/0161981 A1* | 6/2011 | Van De Ven et al. | 718/107 |
| 2011/0283286 A1* | 11/2011 | Wu et al. | 718/103 |
| 2013/0061064 A1 | 3/2013 | Ananthakrishnan et al. | |
| 2014/0189302 A1* | 7/2014 | Subbareddy et al. | 712/30 |
| 2014/0359633 A1* | 12/2014 | Breternitz et al. | 718/104 |

OTHER PUBLICATIONS

PCT Written Opinion of the International Searching Authority for PCT Counterpart Application No. PCT/US2013/044571, 3 pgs., (Sep. 17, 2013).

"Intel Turbo Boost Technology in Intel Core", Intel, White Papers, Nov. 2008, 12 pgs.

* cited by examiner

PROCESSOR HAVING PER CORE AND PACKAGE LEVEL P0 DETERMINATION FUNCTIONALITY

FIELD OF INVENTION

The field of invention relates generally to computing systems, and, more specifically, to a processor having per core and package level P0 determination functionality.

BACKGROUND

FIG. 1 shows the architecture of a standard multi-core processor design 100. As observed in FIG. 1, the processor includes: 1) multiple processing cores 101_1 to 101_N; 2) an interconnection network 102; 3) a last level caching system 103; 4) a memory controller 104 and an I/O hub 105. Each of the processing cores contains one or more instruction execution pipelines for executing program code instructions. The interconnect network 102 serves to interconnect each of the cores 101_1 to 101_N to each other as well as the other components 103, 104, 105. The last level caching system 103 serves as a last layer of cache in the processor 100 before instructions and/or data are evicted to system memory 108. The memory controller 104 reads/writes data and instructions from/to system memory 108. The I/O hub 105 manages communication between the processor and "I/O" devices (e.g., non volatile storage devices and/or network interfaces). Port 106 stems from the interconnection network 102 to link multiple processors so that systems having more than N cores can be realized. Graphics processor 107 performs graphics computations. Other functional blocks of significance (phase locked loop (PLL) circuitry, power management circuitry, etc.) are not depicted in FIG. 1 for convenience.

As the power consumption of computing systems has become a matter of concern, most present day systems include sophisticated power management functions. A common framework is to define both "performance" states and "power" states. A processor's performance is its ability to do work over a set time period. The higher a processor's performance state the more work it can do over the set time period. A processor's performance can be adjusted during runtime by changing its internal clock speeds and voltage levels. As such, a processor's power consumption increases as its performance increases.

A processor's different performance states correspond to different clock settings and internal voltage settings, resulting in different performance vs. power consumption tradeoffs. According to the Advanced Configuration and Power Interface (ACPI) standard the different performance states are labeled with different "P numbers": P0, P1, P2 . . . P_N, where, P0 represents the highest performance and power consumption state and P_N represents the lowest level of power consumption at which a processor is able to perform work. The P1 performance state is the maximum guaranteed performance operating state. The P0 state, also called Turbo state, is any operating point greater than P1. The term "R" in "P_R" represents the fact that different processors may be configured to have different numbers of performance states.

In contrast to performance states, power states are largely directed to defining different "sleep modes" of a processor. According to the ACPI standard, the C0 state is the only power state at which the processor can do work. As such, for the processor to enter any of the performance states (P0 through P_N), the processor must be in the C0 power state. When no work is to be done and the processor is to be put to sleep, the processor can be put into any of a number of different power states C1, C2 . . . CM where each power state represents a different level of sleep and, correspondingly different amount of power savings and a different amount of time needed to transition back to the operable C0 power state.

A deeper level of sleep corresponds to slower internal clock frequencies and/or lower internal supply voltages andpossibly some blocks of logic, being powered off. Increasing C number corresponds to a deeper level of sleep and a correspondingly higher latency to exit and return to the awake or C0 state. Computing systems designed with processors offered by Intel Corp. of Santa Clara, Calif. include a "package level" P0 state referred to as "Turbo Boost" in which the processor as a whole will operate at clock frequencies higher than its rated maximum guaranteed frequency for a limited period of time to achieve greater performance. Here, "package level" means at least one processor chip and possibly other chips such as one or more other processor chips and one or more other system memory (e.g., DRAM) chips. Thus, at a minimum, according to the present state of the Turbo Boost technology, when the package level P0 state is entered, all the cores 101_1 through 101_N of a processor 100 will receive a clock frequency that is higher than the processor's rated maximum guaranteed clock frequency for a limited period of time.

Operating in Turbo mode comes at the price of increased power consumption.Given the power consumption ramifications, entry into Turbo mode is controlled, chiefly determined by the overall workload demand on the processor as a whole exceeding some configurable threshold. That is, entry into the Turbo Boost mode is a function of package level workload demand.

A problem with the present Turbo Boost technology, having only a package level perspective, is its responsiveness. For example, an operating system (OS) instance operating on one core may request entry into the package P0 state. However, the requested P0 state will not be entered unless and until the workload across the processor as a whole, which includes the workload measured across all the processor's cores 101_1 to 101_N, crosses a pre-established threshold.

BRIEF DESCRIPTION OF THE DRAWINGS

A better understanding of the present invention can be obtained from the following detailed description in conjunction with the following drawings, in which.

DETAILED DESCRIPTION

An improvement is to extend the technology to the cores individually. That is, the processor is designed to apply clock frequencies that exceed the processor's rated maximum guaranteed frequency for a limited time period uniquely to different cores on a core-by-core basis rather than to all the cores as a whole. Such functionality might permit, for example, a first core on a processor die to operate within a P0 state while another core on the same processor die operates at a lower performance state, Pi, i>0.

Figure 1:
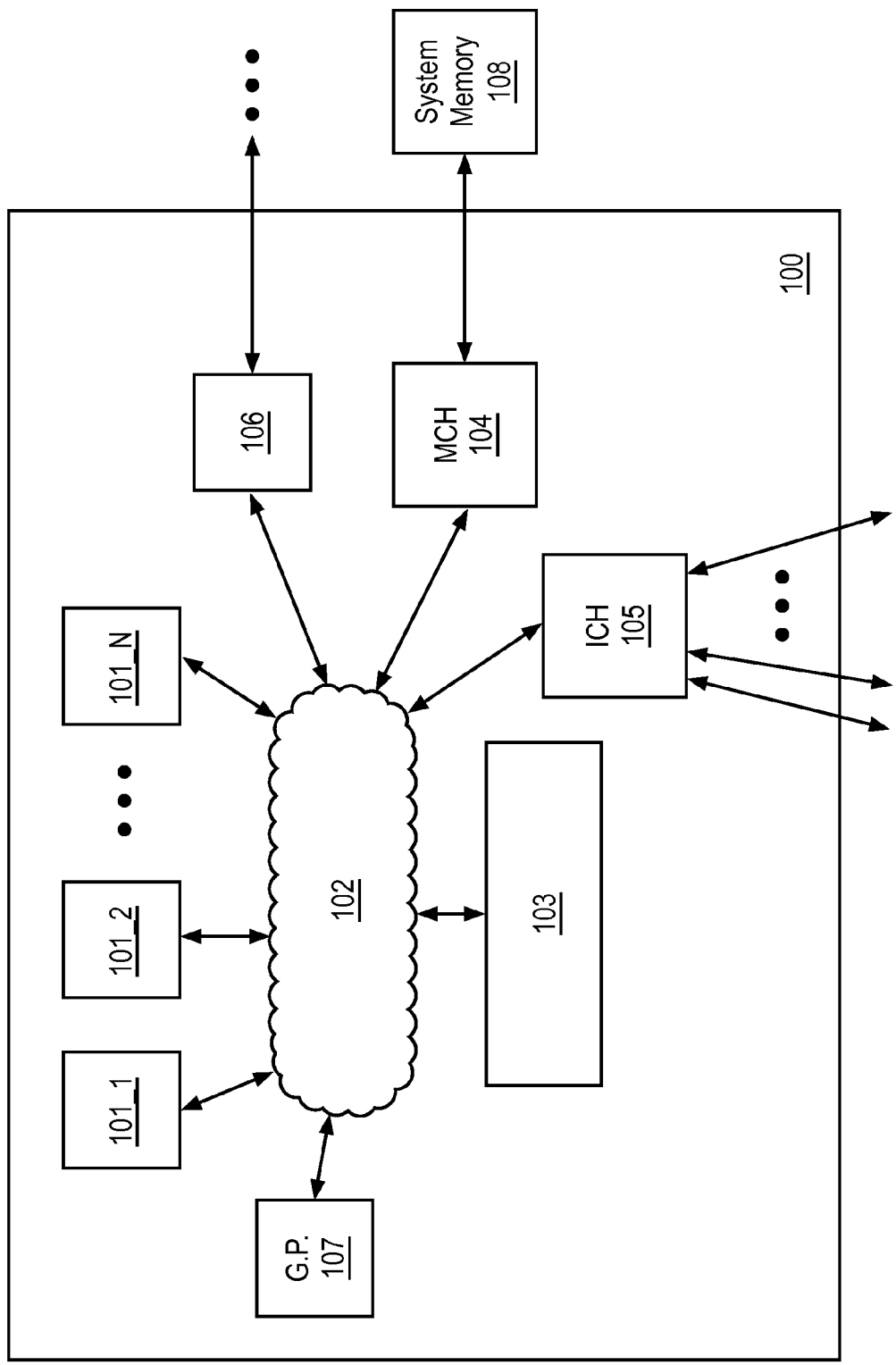
FIG. 1 shows a processor.
Figure 2:
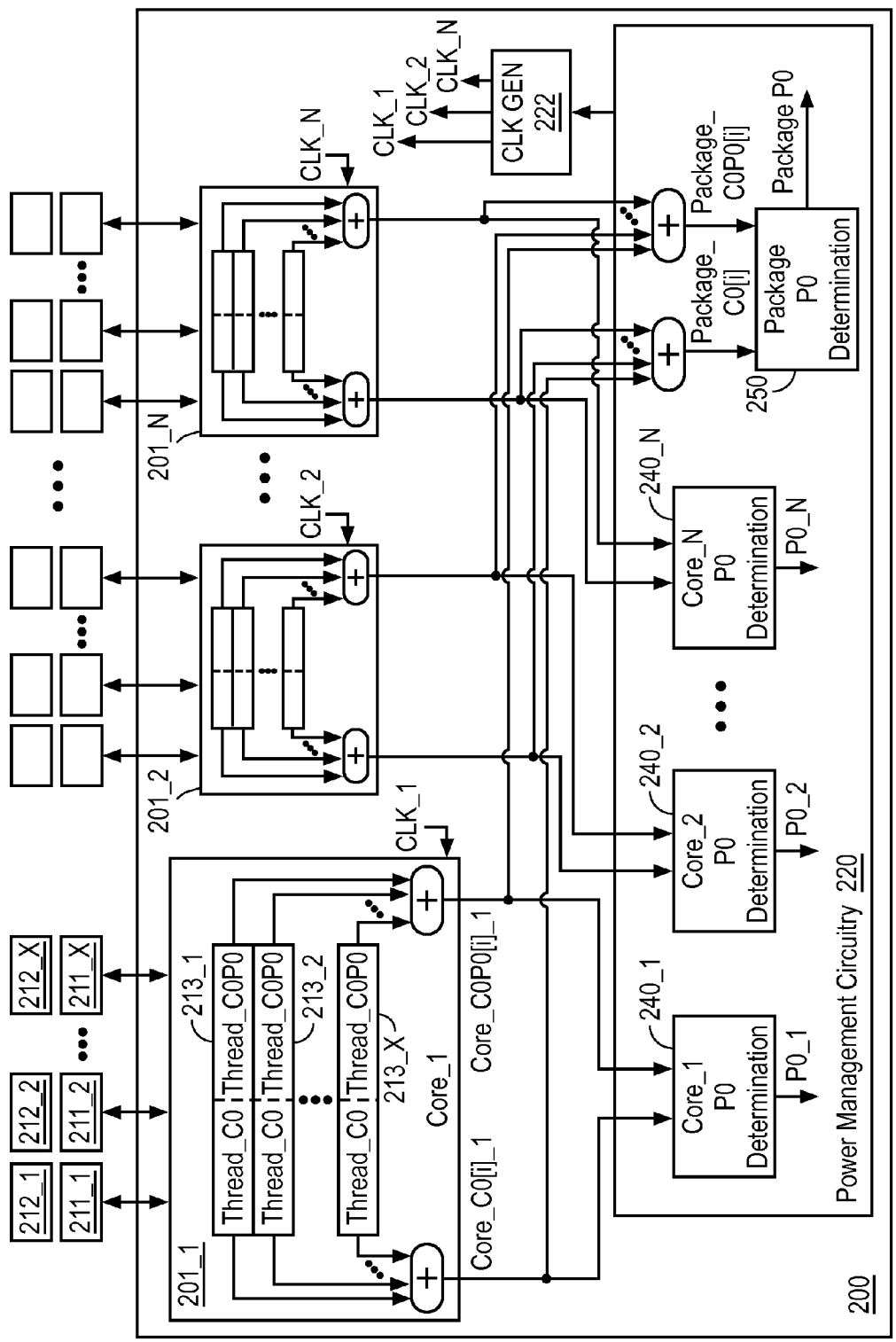
FIG. 2 shows an improved processor having a per core P0 power state determination.

FIG. 2 depicts a processor design 200 for implementing a "per core" P0 performance state in which a singular core, as opposed to all the cores of the processor together, can be configured to operate with a clock speed that exceeds the processor's maximum rated guaranteed frequency for a limited period of time. As observed in FIG. 2, processor 200 includes N processing cores 201_1 through 201_N. Other features of the processor, such as any of the features discussed above with respect to FIG. 1 are not included for convenience in the figure.

Each processing core may be comprised of multiple logical processors or hardware threads. A multi-threaded core is able to concurrently execute different instruction sequence threads over a period of time. According to a typical configuration in a virtualization environment, a virtual machine may be scheduled to run on one or more such logical cores. In a non-virtualization environment, the OS would schedule a process/application on a logical core.

In the embodiment of FIG. 2, in order to monitor the workload of each core, monitoring counters are allocated for each logical core, aka hardware thread on a physical core. Thus, as each core is able to handle as many as X threads, there are X sets of monitoring counters for each core. For example, core 201_1 is allocated monitoring counters 213_1 through 213_X. The set of monitoring counters 213_1 through 213_X are used to monitor the overall workload of core 201_1. According to one particular implementation each set of monitoring counters includes two counters: Thread_C0 and Thread_C0P0.

The Thread_C0 counter counts the number of cycles that its corresponding thread is active, that is not idle, that is in C0 state. For example, the counter increments on each cycle after the thread has specified that its core is to be in the C0 power state unless and until the thread specifies that its core is to enter a sleep state (such as any of sleep states C1, C2, . . . , etc.). Here, it is pertinent to realize that the OS, or virtual machine that runs on a particular thread can specify specific power states for its underlying core.

The Thread_C0P0 counter counts the number of cycles that its corresponding thread is active and has requested entry into the highest performance state. For example, the counter increments on each cycle after the thread has specified that its core is to be in the C0 power state and the P0 performance state unless and until the thread specifies otherwise. In an embodiment, the "cycles" that are counted correspond to the cycle of a clock signal that is applied to all the cores rather than the core's actual, particular cycle time. Here, it is pertinent to point out that different cores may be placed in different performance states each having its own unique clock frequency. If the different clock frequencies of the different cores were used to increment each respective core's count result, the score counts across the cores would be skewed owing to the different counting rates and not be immediately comparable. As such, to alleviate this problem, in an embodiment, the counting on each core utilizes a common, across all cores, clock signal (e.g., from a phase locked loop circuit or delay locked loop circuit) In so doing, all cores, regardless of their operating frequency are treated equally, no penalty, with respect to percentage utilization. Although not explicitly mentioned, this same technique may be applied for any other tabulated per core counts discussed below.

Notably, a thread may request the P0 state long after it has requested the C0 state. In this case, the Thread_C0P0 count begins to increment only after the P0 state has been requested.

Here, again, it is pertinent to realize that theOS or virtual machine that runs on the particular thread can specify performance states for its underlying core as well as power states.

Figure 3A:
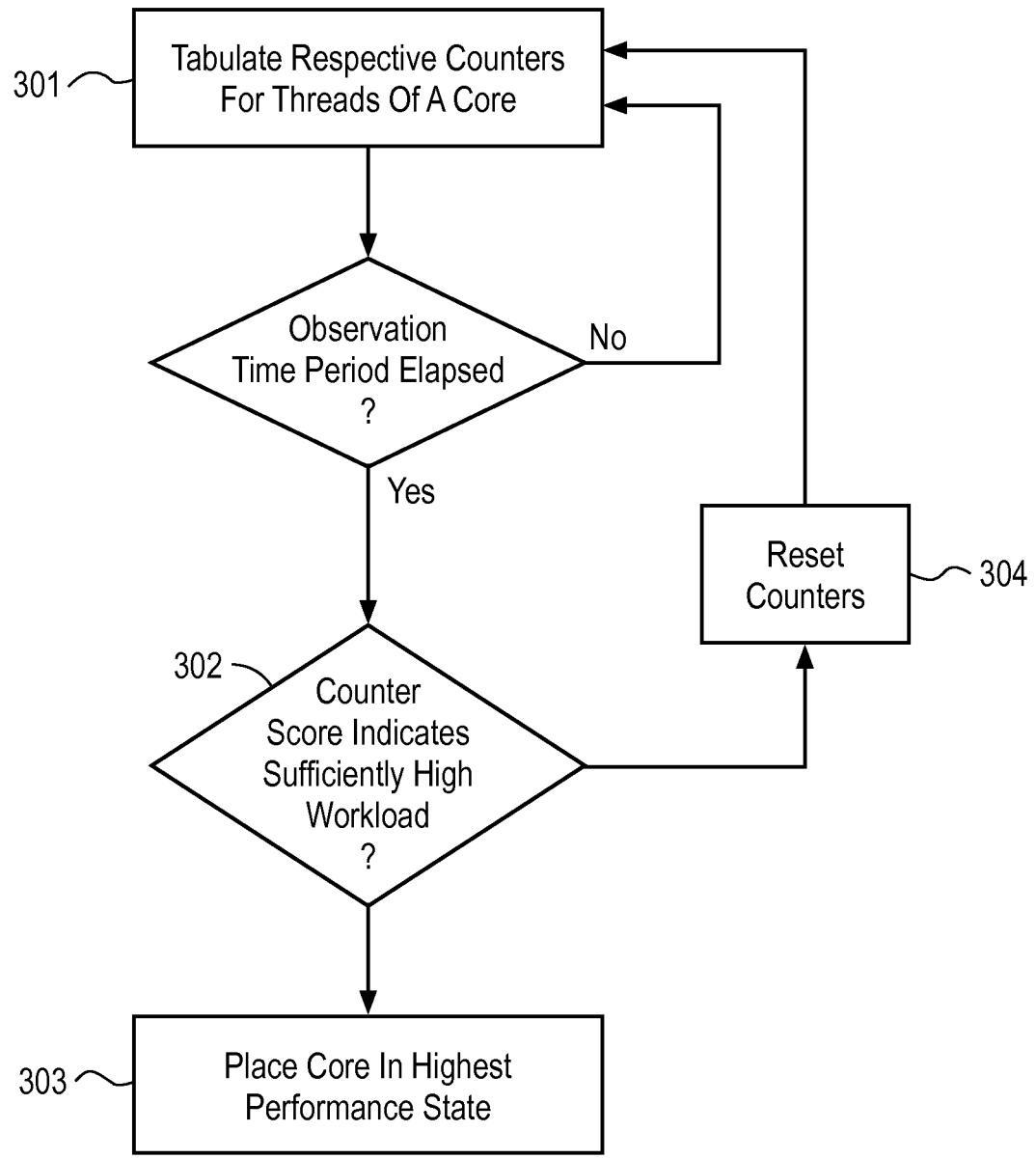
FIG. 3a shows a methodology performed by the improved processor of FIG. 2.

In an embodiment, referring to FIG. 3a, counts are tabulated in the counters 301 for all of a core's threads over a specific "observation" time period.

At the end of each observation period the individual thread aka logical core C0 and C0P0 counts are combined to generate physical core C0 and C0P0 counts. This is done using simple arithmetic addition on each of the individual C0 counts, and C0P0 counts, no taking ratios. In so doing, we have a metric that faithfully reflects degree of utilization even in situations where one or more logical cores associated with a physical core are switched off (in Intel parlance, hyper-threading is turned off to obtain greater single threaded performance), and even in situations where there just be one active process and it hops from one physical core to another.

If, at the end of the observation time period, the consolidated score for a core (discussed in more detail a little later) counters for the core's threads reflects a sufficiently high core workload 302, the core is placed into the highest performance state (e.g., a P0 state) 303. According to one embodiment, the highest performance state permits the core to operate at a frequency higher than the processor's maximum guaranteed rated frequency for a limited period of time.

At the end of each observation period the logical core related C0 and C0P0 counters, once their value is consumed to generate the physical core related C0 and C0P0 score counts are reset and If at the end of the observation time period the counters for the core's threads do not reflect a sufficiently high core workload, the counters are reset 304 and another observation period commences.

Figure 3B:
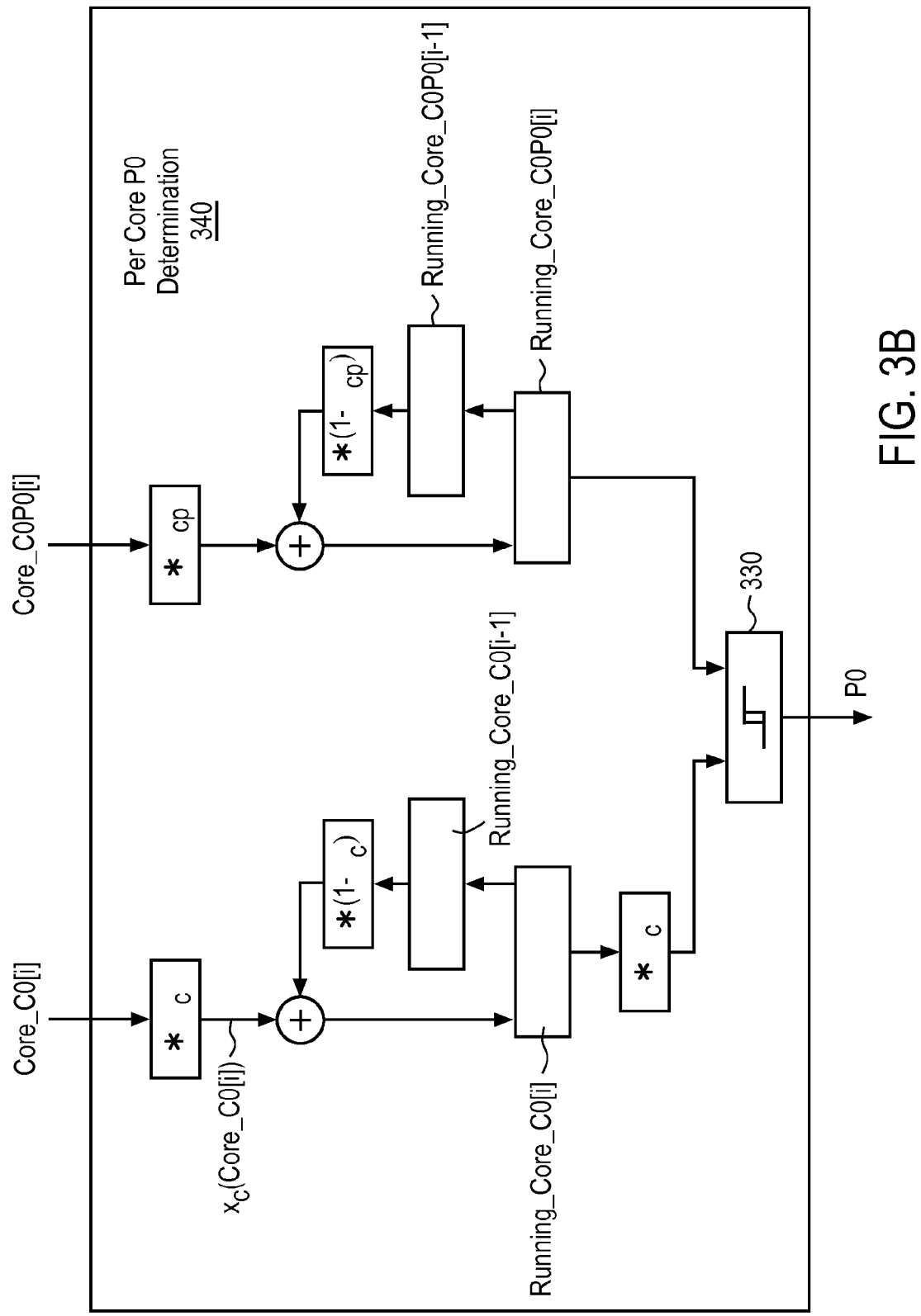
FIG. 3b shows a per core P0 power state determination algorithm that may be performed by the improved processor of FIG. 2.

FIG. 2 and FIG. 3b also depict an embodiment for making a determination, based on the counter values, as to whether or not a core's workload is sufficiently high to warrant entry into the highest performance state. Here, the exemplary "per core" P0 determination logic 340 of FIG. 3b may be instantiated N times 240_1 through 240_N as observed in FIG. 2. As observed in FIGS. 2 and 3b, the individual Thread_C0 counter values for a single core are summed to produce a total C0 count ("score") for the core: Core_C0. Likewise, the Thread_C0P0 counter values for the core are summed to produce a total C0P0 count ("score") for the core: Core_C0P0.

According to the particular embodiment of FIG. 3b, consecutive Core_C0 and Core_C0P0 scores across multiple observation time periods are accumulated into a special formulation that weighs the count value at the conclusion of the most recent observation time period relative to the summation of the count values over previous observation time periods. Specifically, as observed in FIGS. 2 and 3b, the running counts are tabulated as:

$$\text{Running\_Core\_C0}[i] = ((\alpha_c) * \text{core\_C0}[i]) + (((1-(\alpha_c)) * \text{Running\_Core\_C0}[i-1])$$

$$\text{Running\_Core\_C0P0}[i] = (\alpha_{cp}) * \text{core\_C0P0}[i]) + (((1-(\alpha_{cp})) * \text{Running\_Core\_C0P0}[i-1])$$

where each increment of i corresponds to a next observation time period. Here, both $\alpha_c$ and $\alpha_{cp}$ are individually assigned a value between 1.000 and 0.000 (notably, any precision can be used to specify $\alpha_c$ and $\alpha_{cp}$). A value closer to 1.000 weights a respective running core score to more heavily reflect only the count value of the most recent observation time period, whereas, a value closer to 0.000 weights the respective running core score to more heavily reflect the accumulated count of the scores of the previous observation time periods.

The former provides for more immediate responsiveness to a sudden event, while, the later provides for a more measured approach that responds to behavior trend demonstrated only after multiple time periods have been observed. As will be described in more detail below, according to one approach, $\alpha_c$ and $\alpha_{cp}$ values are kept closer to 1.000 than to 0.000 to ensure that the processor's power management logic 220 can react to sudden increases in core workload by quickly placing the core into the P0 state in response. In an embodiment $\alpha_c$ is set equal to $\alpha_{cp}$, however, they may be set to be unequal according to designer preference.

In an embodiment, as observed in FIG. 3b, the decision as to whether a workload threshold has been crossed so as to cause entry into a highest performance state is based on whether the Running_Core_C0P0 is a sufficiently high percentage of Running_Core_C0. Said another way, if the core demonstrates that a sufficiently high percentage of thread cycles executed in the C0 state were executed after a corresponding OS / virtual machine had requested the P0 state, then, entry into the P0 state for the core is deemed warranted. In the embodiment of FIG. 3b, the decision is essentially calculated as:

---
If
(Running_Core_C0P0[i] > $\beta_c$ * Running_Core_C0[i])
THEN core performance state = P0

--- where $\beta_c$ represents the percentage of cycles in the C0state where the P0 state has been requested by the OS. More formally, in order to prevent thrashing (unstable, rapid back-and-forth entry into and departure from the P0 state when Running_Core_C0P0[i] is approximately equal to $\beta_c$ * Running_Core_C0[i]), some hysteresis 330 is built into the P0 determination algorithm according to:

---
If
(Running_Core_C0P0[i] > $\beta_{c\_h}$ * Running_Core_C0[i])
THEN core performance state = P0
  ELSE If ((core performance state == P0) and
(Running_Core_C0P0[i] < $\beta_{c\_l}$ * Running_Core_C0[i]) )
  THEN core performance state = ! P0 //exit core turbo mode

--- where $\beta_{c\_l} < \beta_{c\_h}$.

As observed in FIG. 2, power management circuitry 220 includes the logic circuitry, e.g., 240_1, used to tabulate the appropriate scores and ultimately decide whether a particular core is to enter the P0 state. The power management circuitry 220 is coupled to clock generation circuitry 222, such as phase locked loop circuitry, to raise the clock frequency to an individual core entering the P0 state to a clock frequency that exceeds the processor's maximum rated guaranteed operating frequency for a limited period of time, and, likewise, lower the core's clock frequency if the core is to be taken out of the P0 state.

Another feature is that the per-core P0 state technology described just above can also be designed to work harmoniously with the more traditional approach, discussed in the background section, that only views the P0 state as an entire processor state that affects all processor cores equally.

Figure 3C:
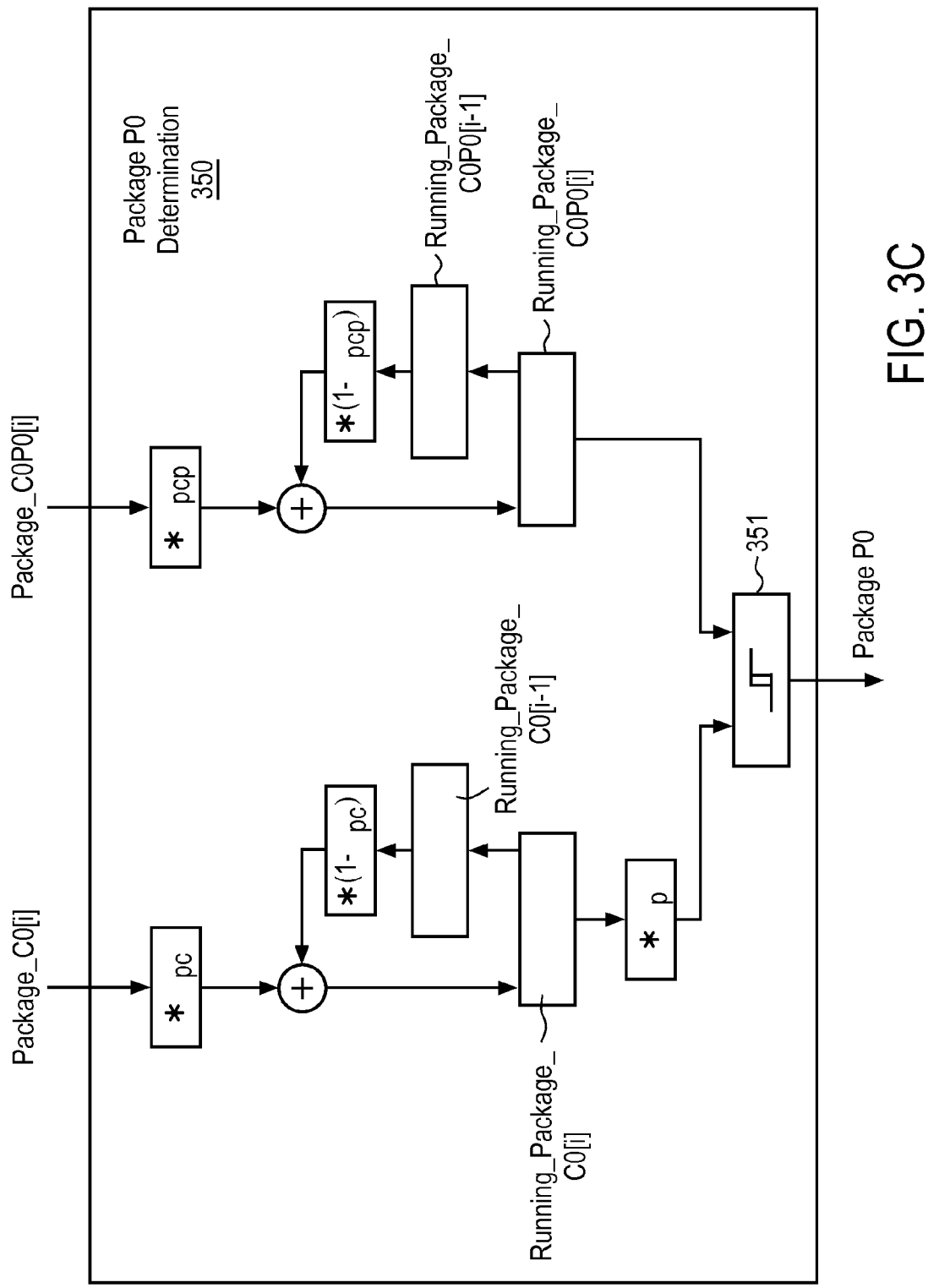
FIG. 3c shows an package level P0 power state determination algorithm that may be performed by the improved processor of FIG. 2.

As such, as observed in FIGS. 2 and 3c, another set of counters are maintained for Package_C0 and Package_C0P0, where, Package_C0 is the summation of each respective Core_C0 value for all cores of the processor, and, Package_C0P0 is the summation of each respective package_C0P0 value for all cores of the processor. As such, Package_C0 provides a processor-wide indication of the thread resources that are executing in the C0 power state, and, Package_C0P0 provides a processor-wide indication of the thread resources that are executing in the C0 power state where the P0 performance state has been requested.

Similar to the individual core analysis, the package level analysis 250, according to one embodiment 350 observed in FIG. 3c, can be determined according to:

---
Running_Package_C0[i] = (($\alpha_{pc}$)*package_C0[i])+(((1 - ($\alpha_{pc}$))*Running_Package_C0[i-1])
Running_Package_C0P0[i] = (($\alpha_{pcp}$)*package_C0P0[i])+(((1 - ($\alpha_{pcp}$))*Running_Package_C0P0[i-1])

--- where $\alpha_{pc}$ corresponds to how much weight is given to the current package_C0 value relative to the summation of previous package_C0 values, and, $\alpha_{pcp}$ corresponds to how much weight is given to the current package_C0P0 value relative to the summation of previous package_C0P0 values.

According to one approach, both the $\alpha_{pc}$ and $\alpha_{pcp}$ values are given a value closer to 0.000 than both of the $\alpha_c$ and $\alpha_{cp}$ values so that the package level P0 state, in which all cores are provided a frequency that exceeds the processor's maximum rated frequency for a limited period of time, is entered with less responsiveness than the per core level entry into a P0 state. That is, the $\alpha_c$ and $\alpha_{cp}$ values are set closer to 1.000 than the $\alpha_{pc}$ and $\alpha_{pcp}$ values so that a singular core can enter its own P0 state relatively quickly in response to a sudden increase in workload to the core, and, by contrast, the processor-wide package level P0 state is entered only after a more measured observation is made that weighs past workload demand across the cores more heavily than the per core approach. In an embodiment, $\alpha_{pc}$ and $\alpha_{pcp}$ are set equal to one another although designer's may choose to set them to be unequal.

Also like the per-core approach, hysteresis 351 may be built into the package level P0 state determination according to:

---
If
(Running_Package_C0P0[i] > $\beta p\_h$ * Running_Package_C0[i])
THEN package performance state = P0
  ELSE If ((package performance state == P0) and
(Running_Package_C0P0[i] < $\beta p\_l$ * Running_Package_C0[i]) )
  THEN core performance state = ! P0 // exit package performance mode

--- where $\beta_{p\_l} < \beta_{p\_h}$ to prevent thrashing between entry into and exit from the package level P0 state. According to a further embodiment, $\beta p\_l < 0.5 * \beta p\_h$.

Here, it is pertinent to point out that the combination of per core and package level control as described above can be utilized to "override" a previous user setting because under current utilization conditions such an override is warranted. For example, a user may set the processor for "green" mode or some other power saving mode as a general configuration of the processor. The condition may arise, however, that the workload presented to the cores is so extreme that it makes sense to temporarily override the user setting to meet the peak demand. Here, the tabulated counts for the package and per core levels can be used as basis for deciding to override such a user setting. Here, the specific count levels sufficient to trigger an override may be programmed in hardware. Alternatively or in combination the processor may be designed to expose counts to software (via register space and/or memory) so that software (such as power management software) can make the decision.

It is pertinent to point out that although the above discussion has been directed largely to the performance states affecting general purpose processing cores, other types of cores, such as graphics processing cores may also be adapted to be handled according to the techniques described herein. For example, a processor having one or more graphics cores may enter the P0 state individually according to the per core approach described above. The analysis for determining whether the P0 state is appropriate or not for the graphics processing core may include $\alpha_c$ and $\alpha_{pc}$ values that are the same or different than those that are established for the general purpose cores. The same approach as for a graphics processor may also be taken with respect to any accelerators that are embedded in the processor. Accelerators, as is known to those of ordinary skill, are dedicated hardware blocks designed to perform specific complex functions (such as encryption/decryption, dsp (digital signal processing), specific mathematical functions for, e.g., financial calculations, scientific computing calculations, etc.) in response to fewer commands/instructions than the number of instructions a general purpose core would need to perform the same function.

With respect to implementation, any/all of the tabulated Thread_C0, Core_C0, Thread_P0C0, Core_P0C0, Running_Core_C0, Running_Core_P0C0, Package_C0 and Package_C0P0, Running_Package_C0 and Running_Package_P0C0 counts may be kept in register space of the processor. Such register space may be read only or even read/writeable model specific register (MSR) space of the processor to permit software (e.g, virtual machine monitor (VMM) software, OS or other management software) to monitor the counts.

In one embodiment, the hardware logic of the power management circuitry 220 that determines core level and package level entry/exit to/from the P0 state may be enabled/disabled in MSR space so that, for example, in the case of disablement, VMM software can monitor the tabulated counts from MSR space and command per core and package level P0 state entry/exit through additional MSR space. Memory space may also be reserved for the core level counts. In the same or alternative embodiment, any and/or all of the $\alpha_c$, $\alpha_{cp}$, $\alpha_{pc}$, $\alpha_{pcp}$, $\beta_{c\_l}$, $\beta_{c\_h}$, $\beta_{p\_l}$, $\beta_{p\_h}$ parameters may be programmed by (e.g., VMM or cloud monitoring) software (e.g., by writing to MSR space) to customize the per-core and/or package level P0 entry/exit dynamics. Any such programmable parameters may be loaded at system bring-up time from BIOS.

The circuitry used to implement the per core P0 determination algorithms (e.g., of FIG. 3*b*) and package level P0 determination (e.g., of FIG. 3*c*) may be implemented with dedicated logic circuitry, as a micro-controller that executes the algorithm typically with a small program code footprint, software code executed on a processing core such as any of processing cores 201_1 through 201_N, or any combination thereof.

As any of the logic processes taught by the discussion above may be performed with a controller, micro-controller or similar component, such processes may be program code such as machine-executable instructions that cause a machine that executes these instructions to perform certain functions. Processes taught by the discussion above may also be performed by (in the alternative to the execution of program code or in combination with the execution of program code) by electronic circuitry designed to perform the processes (or a portion thereof).

It is believed that processes taught by the discussion above may also be described in source level program code in various object-orientated or non-object-orientated computer programming languages. An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor comprising:
a processing core;
a plurality of counters for said processing core, said plurality of counters to count for each of multiple threads supported by said processing core:
 a first value that reflects a number of cycles at which a non sleep state has been requested for said first value's corresponding thread, and
 a second value that reflects a number of cycles at which a non sleep state and a highest performance state has been requested for said second value's corresponding thread, said first value's corresponding thread and said second value's corresponding thread being a same thread; and
circuitry to make a determination whether said processing core is to enter said highest performance state based on the first value and the second value and to execute the processing core in the highest performance state based on the determination.

2. The processor of claim 1 wherein the processing core is a first processing core and further comprising:
a second processing core; and
a second plurality of counters for said second processing core, said second plurality of counters to count for each of multiple threads supported by said second processing core:
 another first value that reflects a number of cycles at which a non sleep state has been requested for said another first value's corresponding thread, and
 another second value that reflects a number of cycles at which a non sleep state and a highest performance state has been requested for said another second value's corresponding thread, said another first value's corresponding thread and said another second value's corresponding thread being a same thread,
 wherein respective counters of said first and second processing cores are to increment based on a same clock frequency.

3. The processor of claim 2 further comprising:
second circuitry to determine whether said second processing core is to enter its highest performance state based on the another first value and the another second value.

4. The processor of claim 3 further comprising:
third circuitry to determine whether said processor is to enter its highest package level performance state based on a first combination of said first value and said another first value, and a second combination of said second value and said another second value.

5. The processor of claim 3 further comprising register space to enter programmable values that establish relative weights of past versus current contents of said first and second plurality of counters utilized by said circuitry and said second circuitry in making their respective determinations.

6. The processor of claim 3 wherein said circuitry and said second circuitry are coupled to receive program code to execute said program code to make either or both of said determinations.

7. The processor of claim 3 wherein said circuitry and said second circuitry comprise power management circuitry.

8. The processor of claim 7 wherein said power management circuitry is coupled to clock generation circuitry that provides clock signals to said first and second processing cores.

9. A method comprising:
performing the following on a multi-core processor:
incrementing a first counter reserved for a first thread of a processing core for each cycle said first thread is in a state in which a non sleep power state has been requested for said first thread;
incrementing a second counter reserved for said first thread for each cycle said first thread is in a state in which a non sleep power state and highest performance state has been requested for said first thread;
incrementing a first counter reserved for a second thread of said processing core for each cycle said second thread is in a state in which a non sleep power state has been requested for said second thread;
incrementing a second counter reserved for said second thread for each cycle said second thread is in a state in which a non sleep power state and highest performance state has been requested for said second thread;
determining whether said processing core is to enter said highest performance state based on the contents of the first counters and the second counters; and
executing the processing core in the highest performance state based on the determining.

10. The method of claim 9 further comprising: adding contents of said first counters reserved for said first and second threads to produce a first metric for said processing core.

11. The method of claim 10 further comprising: adding contents of said second counters reserved for said first and second threads to produce a second metric for said processing core.

12. The method of claim 11 wherein the determining comprises determining whether said processing core is to enter said highest performance state based on said first and second metrics.

13. The method of claim 12 wherein said determining includes calculating a percentage that one of the metrics is of the other of the metrics.

14. The method of claim 11 wherein at least one of said first and second metrics is determined from programmable values that establish the weight of current first and second counter values versus past first and second counter values.

15. The method of claim 9 further comprising:
incrementing a first counter reserved for a first thread of a second processing core for each cycle said first thread is in a state in which a non sleep power state has been requested for said first thread;
incrementing a second counter reserved for said first thread of said second processing core for each cycle said first thread is in a state in which a non sleep power state and highest performance state has been requested for said first thread;
incrementing a first counter reserved for a second thread of said second processing core for each cycle said second thread is in a state in which a non sleep power state has been requested for said second thread; and
incrementing a second counter reserved for said second thread of said second processing core for each cycle said second thread is in a state in which a non sleep power state and highest performance state has been requested for said second thread.

16. The method of claim 15 further comprising adding contents of said first counters reserved for said first and second threads of said processing core and said second processing core to determine a first metric for said processor.

17. The method of claim 16 further comprising adding contents of said second counters reserved for said first and second threads of said processing core and said second processing core to determine a second metric for said processor.

18. The method of claim 17 wherein the determining comprises determining whether said processor is to enter a highest package level performance state based on said first and second metrics.

19. A non-transitory computer readable medium containing program code that when executed on a multi-core processor causes said multi-core processor to perform a method comprising:
incrementing a first counter reserved for a first thread of a processing core for each cycle said first thread is in a state in which a non sleep power state has been requested for said first thread;
incrementing a second counter reserved for said first thread for each cycle said first thread is in a state in which a non sleep power state and highest performance state has been requested for said first thread;
incrementing a first counter reserved for a second thread of said processing core for each cycle said second thread is in a state in which a non sleep power state has been requested for said second thread;
incrementing a second counter reserved for said second thread for each cycle said second thread is in a state in which a non sleep power state and highest performance state has been requested for said second thread;
determining whether said processing core is to enter said highest performance state based on the contents of the first counters and the second counters; and
executing the processing core in the highest performance state based on the determining.

20. The non-transitory computer readable medium of claim 19, wherein the method further comprises:
incrementing a first counter reserved for a first thread of a second processing core for each cycle said first thread is in a state in which a non sleep power state has been requested for said first thread;
incrementing a second counter reserved for said first thread of said second processing core for each cycle said first thread is in a state in which a non sleep power state and highest performance state has been requested for said first thread;
incrementing a first counter reserved for a second thread of said second processing core for each cycle said second thread is in a state in which a non sleep power state has been requested for said second thread; and
incrementing a second counter reserved for said second thread of said second processing core for each cycle said second thread is in a state in which a non sleep power state and highest performance state has been requested for said second thread.

\* \* \* \* \*